(12) United States Patent
Raghavan et al.

(10) Patent No.: US 11,768,824 B2
(45) Date of Patent: Sep. 26, 2023

(54) METHOD AND SYSTEM FOR PERFORMING REAL-TIME DATA VALIDATION

(71) Applicant: Wipro Limited, Bangalore (IN)

(72) Inventors: Girish Raghavan, Chennai (IN); Thamilchelvi Peterbarnabas, Chennai (IN); Inderjeet Yadav, Haryana (IN); Arunachalam Lakshmanan, Bangalore (IN); Sindhu P, Chennai (IN)

(73) Assignee: Wipro Limited, Karnataka (IN)

(*) Notice: Subject to any disclaimer, the term of this patent is extended or adjusted under 35 U.S.C. 154(b) by 219 days.

(21) Appl. No.: 16/940,415

(22) Filed: Jul. 28, 2020

(65) Prior Publication Data

US 2021/0303548 A1 Sep. 30, 2021

(30) Foreign Application Priority Data

Mar. 31, 2020 (IN) .............................. 202041014486

(51) Int. Cl.
*G06F 16/23* (2019.01)
*G06N 5/04* (2023.01)
*G06N 20/00* (2019.01)
*G06F 16/22* (2019.01)

(52) U.S. Cl.
CPC ........ *G06F 16/2365* (2019.01); *G06F 16/221* (2019.01); *G06N 5/04* (2013.01); *G06N 20/00* (2019.01)

(58) Field of Classification Search
CPC ... G06F 16/2365; G06F 16/221; G06N 20/00; G06N 5/04
See application file for complete search history.

(56) References Cited

U.S. PATENT DOCUMENTS

| | | | |
|---|---|---|---|
| 8,423,596 | B2 | 4/2013 | Gifford |
| 9,037,589 | B2 | 5/2015 | Anderson |
| 2018/0336509 | A1* | 11/2018 | Guttmann ............... G06F 9/505 |
| 2019/0057137 | A1* | 2/2019 | Bradham ............... G16H 10/20 |
| 2020/0401506 | A1* | 12/2020 | Sathianarayanan ... G06F 16/955 |
| 2021/0109818 | A1* | 4/2021 | Perneti ................... G06F 11/324 |
| 2021/0216903 | A1* | 7/2021 | Suryawanshi ........... G06N 5/04 |

* cited by examiner

*Primary Examiner* — Mariela Reyes
*Assistant Examiner* — Courtney Harmon
(74) *Attorney, Agent, or Firm* — Finnegan, Henderson, Farabow, Garrett & Dunner, LLP

(57) ABSTRACT

The disclosure relates to method and system for performing real-time data validation. The method includes fetching a plurality of metadata from a set of external data sources and a set of external file storage systems. The plurality of metadata is fetched along with a set of connection configuration parameters and column mapping information The method further includes generating a set of clusters for performing data validation in an external processing infrastructure based on an analysis of the plurality of metadata and of the external processing infrastructure. The method further includes determining a set of test scripts from a plurality of test scripts based on the column mapping information and the set of connection configuration parameters. The method further includes performing a real-time data validation by executing the set of test scripts in the set of clusters.

17 Claims, 8 Drawing Sheets

METHOD AND SYSTEM FOR PERFORMING REAL-TIME DATA VALIDATION

TECHNICAL FIELD

This disclosure relates generally to data validation, and more particularly to method and system for performing real-time data validation.

BACKGROUND

In recent years, volume and variety of data has increased exponentially. In addition, data communication has also increased between a host and a storage array. Therefore, an important factor that needs to be consider during data communication is data assurance. The data assurance increases integrity of data across an entire storage system. The data assurance may be required while migrating to new databases, transformation of data, applying business rules, developing business views, performing analytics, and so forth. Moreover, the data assurance may be performed during data communication by validating the data.

However, existing techniques for performing data assurance are limited in their scope and utility. For example, most of the existing techniques are performed manually. Additionally, existing techniques perform data validation with a very limited sample of data and require physical storing of data into local system for validation. Further, existing techniques have limited capability to handle and validate huge data sets, which, in turn, may result in inefficient and ineffective data assurance. Thus, some of the major problems include inadequate coverage of data requirements leading to defect slippage to production, asynchronous data comparison resulting ambiguity in the data output, data privacy and security issues, large infrastructure dependency for processing the data, lack of on-demand new data base configuration support for both on premise and cloud, and inability to perform data validation without storing the data. Therefore, there is a need of a mechanism that may eliminate the limitations of the conventional techniques by facilitating data validation for the huge set of data with limited infrastructure.

SUMMARY

In an embodiment, a method for performing real-time data validation is disclosed. In one example, the method may include fetching a plurality of metadata from a set of external data sources and a set of external file storage systems. The plurality of metadata may be fetched along with a set of connection configuration parameters and column mapping information. The method may further include generating a set of clusters for performing data validation in an external processing infrastructure based on an analysis of the plurality of metadata and of the external processing infrastructure. The method may further include determining a set of test scripts from a plurality of test scripts based on the column mapping information and the set of connection configuration parameters. The set of test scripts may be configured to validate data from each of a plurality of external data sources and each of a plurality of external file storage systems. The method may further include, performing a real-time data validation by executing the set of test scripts in the set of clusters.

In another embodiment, a system for performing real-time data validation is disclosed. In one example, the system may include a processor and a memory communicatively coupled to the processor, wherein the memory stores processor instructions, which, on execution, causes the processor to fetch a plurality of metadata from a set of external data sources and a set of external file storage systems. The plurality of metadata may be fetched along with a set of connection configuration parameters and column mapping information. The processor-executable instructions, on execution, may further cause the processor to generate a set of clusters for performing data validation in an external processing infrastructure based on an analysis of the plurality of metadata and of the external processing infrastructure. The processor-executable instructions, on execution, may further cause the processor to determine a set of test scripts from a plurality of test scripts based on the column mapping information and the set of connection configuration parameters. The set of test scripts may be configured to validate data from each of a plurality of external data sources and each of a plurality of external file storage systems. The processor-executable instructions, on execution, may further cause the processor to perform a real-time data validation by executing the set of test scripts in the set of clusters.

In yet another embodiment, a non-transitory computer-readable storage medium, storing computer-executable instructions for performing real-time data validation is disclosed. The stored instructions, when executed by a processor, may cause the processor to perform operations including fetching a plurality of metadata from a set of external data sources and a set of external file storage systems. The plurality of metadata may be fetched along with a set of connection configuration parameters and column mapping information. The operations further include generating a set of clusters for performing data validation in an external processing infrastructure based on an analysis of the plurality of metadata and of the external processing infrastructure. The operations further include determining a set of test scripts from a plurality of test scripts based on the column mapping information and the set of connection configuration parameters. The set of test scripts may be configured to validate data from each of a plurality of external data sources and each of a plurality of external file storage systems. The operations further include, performing a real-time data validation by executing the set of test scripts in the set of clusters.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
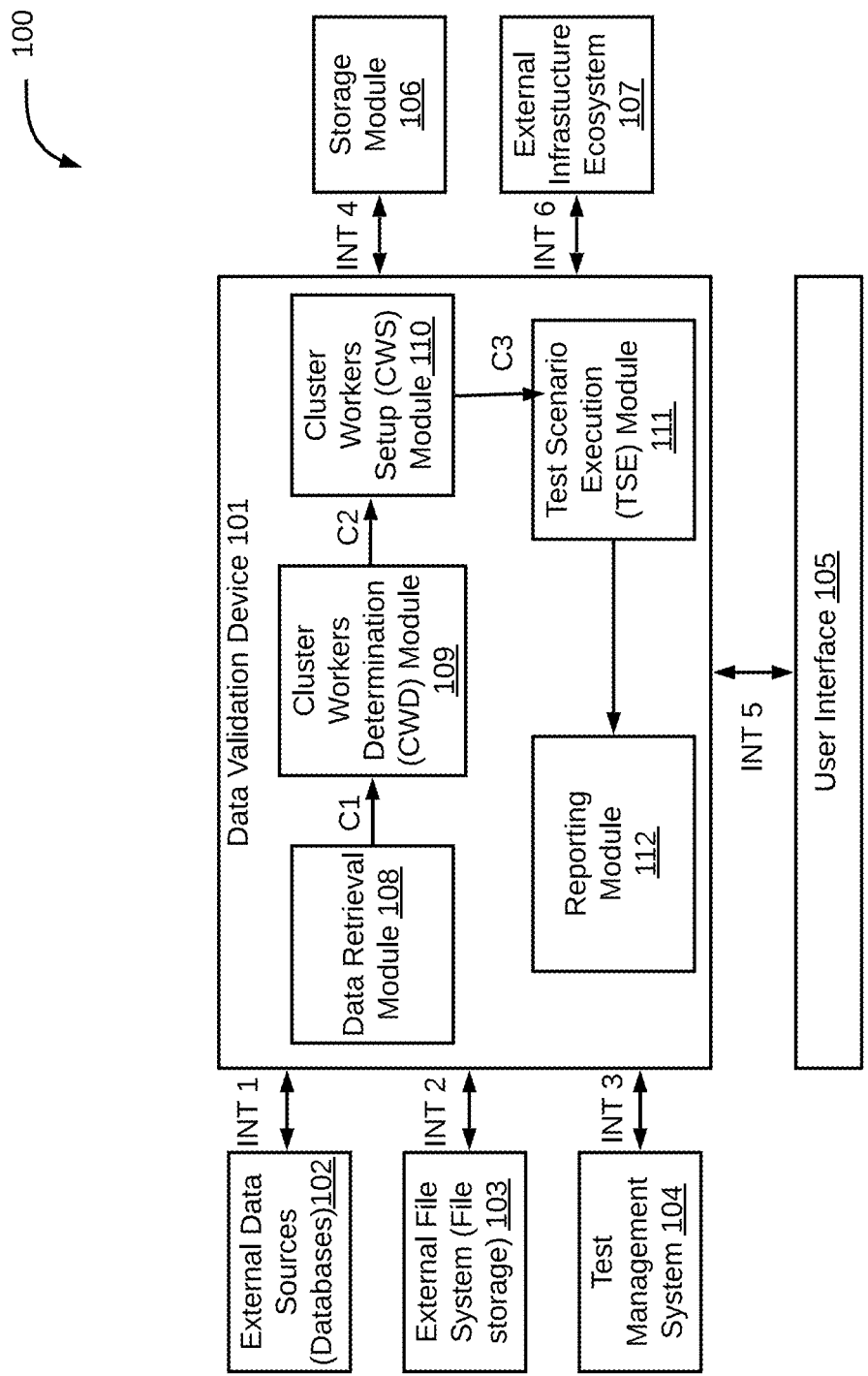
FIG. 1 is a functional block diagram of an exemplary system comprising a data validation device for performing real-time data validation, in accordance with some embodiments of the present disclosure.

Referring now to FIG. 1, a functional block diagram of an exemplary system 100 comprising a data validation device 101 for performing real-time data validation is illustrated, in accordance with some embodiments of the present disclosure. The system 100 may include the data validation device 101 along with various modules that perform various functions so as to perform real-time data validation. The various modules of system 100 includes an external data sources (data bases) 102, an external file systems (file storage) 103, a test management system 104, a User Interface (UI) 105, a storage module 106, an external infrastructure eco system 107. In addition, the data validation device 101 may include, a data retrieval module 108, a Cluster Workers Determination (CWD) module 109, a Cluster Workers Setup (CWS) module 110, a Test Scenario Execution (TSE) module 111, and a reporting module 112. It should be noted that, in some embodiments, the aforementioned modules 101-111 may be a part of the data validation device 101. As will be appreciated, the data validation device 100 may also include various other modules than those mentioned above so as to perform real-time data validation. Further, as will be appreciated by those skilled in the art, all such aforementioned modules 101-111 may be represented as a single module or a combination of different modules. Moreover, as will be appreciated by those skilled in the art, each of the modules 101-111 may reside, in whole or in parts, on one device or multiple devices in communication with each other.

The external data sources (data bases) 102 may be any industry standard or open source databases. The external data sources (data bases) 102, may correspond to a database from where a data may be collected, stored, processed, maintained, and accessed electronically in an organized manner. In an embodiment, the data may correspond to a plurality of meta data. It should be noted that, the data may be structured, semi structured or unstructured based on a type of database it is stored in. The type of database may correspond to a Relational Database Management Systems (RDBMS) or a Non-Relational Databases (NOSQL). In addition, huge volumes of the data that may not be processed by the RDBMS or the NOSQL, may be processed using a big data. The big data may also be referred as the external data sources 102. The external data sources 102 may provide a Java Database connectivity (JDBC) or an Open Database Connectivity (ODBC) based on an interface, i.e., INT 1. The interface INT 1 may enable a user of the system 100 to retrieve and send the data to the data retrieval module 108. In addition, data validation scenarios may be executed using the TSE module 111.

The external file systems (file storage) 103 may be any industry standard or open source file-based data storage system. The external file systems (file storage) 103 may correspond to a file storage, where the data may be organized, stored, and presented in a format of files and folders. The external file system (file storage) 103 may correspond to a direct single system storage or a network attached storage from where files may be stored and retrieved later. The external file systems (file storage) 103 may provide an interface, i.e., INT 2, based on address or path of the files or folders stored. The interface INT 2 may enable the user of the system 100 to retrieve and send the data to the data retrieval module 108. In addition, the data validation scenarios may be executed using the TSE module 111.

The test management system 104 may be any industry standard or open source tool. The test management system 104 may store and maintain all test artifacts. The test artifacts may include test requirements, a set of test scripts, and test reports. The test management system 104 may allow multiple users to create test scripts, edit test scripts, execute test scripts, establish traceability, and upload test execution reports on testing performed against the data validation 101 under test. It should be noted that, the data validation device 101 may be included in any application. The test management system 104 may also provide an interface, i.e., INT 3. The interface INT 3 may correspond to any of a representational state transfer (REST) interface, a simple object access protocol (SOAP) interface, or any proprietary interface. The interface INT 3 may enable the user of the system 100 to upload or download test artifacts (i.e., test requirements, the set of test scripts and test reports), trigger test suite execution, and upload results.

The UI 105 of the system 100 may include screens through which configurations may be done. The UI 105 may establish required relationships between a source and a target of the external data sources (data bases)102 or the external file systems (file storage) 103. Moreover, the UI 105 may generate a trigger for execution in the TSE module 111. In addition, the UI 105 may integrate the TSE module 111, test management tool 104, and the storage module 106, in order to display test execution reports (also referred as a consolidated report) in the reporting module 112. The storage module 106 of the system 100 may store the data (also referred as the plurality of meta data). The storage module 106 may correspond to a database. In addition, the storage module 105 may be connected with the data validation device 101 via an interface, i.e., INT4.

The external infrastructure ecosystem 107 may correspond to an ecosystem where computing and processing of the data may happen. The external infrastructure ecosystem 107 may correspond to any hardware servers. In addition, the external infrastructure ecosystem 107 may be connected with the data validation device 101 via an interface, i.e., INT6.

The data retrieval module 108 of the data validation device 101 may retrieve the plurality of data from the external data sources 102 and the external file system 103. The data retrieval module 108 may retrieve the set of test scripts defined in the test management system 104 via interface INT 3. By way of an example, the set of test scripts may correspond to the SQL queries. The data retrieval module 108 may then execute each of the set of test scripts to validate data received from a source data and a target data of the external data sources (data bases)102 or the external file systems (file storage) 103. In addition, the data retrieval module 108 may execute each of the set of test scripts based on connection established via interfaces INT 1 & INT 2 in order to perform following activities as listed below:

Verify the connection is existing or new
Verify the type of connection
Check the connection
Check the SQL queries, tables and columns mapping of the data sources Moreover, the plurality of metadata retrieved may be stored in the storage module 106 via an interface, i.e., INT 5.

The CWD module 109 may help in determining a set of clusters that may be required for processing the plurality of data for verification and validation. The set of clusters may include a number of clusters and a size of each of the set of clusters. The CWD module 109 may analyze the plurality of metadata retrieved from the data retrieval module 108. In addition, the CWD module 109 may retrieve the plurality of metadata via connector C1. Moreover, based on analysis, the set of clusters required may be determined to process the plurality of metadata. Thereafter, the set of clusters determined may be sent as a request to the CWS module 110 in order to build the set of clusters via connector C2.

The CWS module 110 may help in creating clusters that may be required for processing the plurality of metadata in the external infrastructure ecosystem 106. The CWS module 110 may perform a set of functional steps in order to create the cluster. A first step of the set of functional steps may include analyzing a request received for creation the set of clusters from the CWD module 109 via connector C2. A second step may include scanning availability of an infrastructure in the external infrastructure ecosystem 107 via an interface, i.e., INT 6. A third step may include reserving a size required of the external infrastructure ecosystem via the interface INT 6. A fourth step may include initiating a generation process for each of the set of clusters determined. Once the generation process is completed, a fifth step may include generating the set of clusters on the external infrastructure eco system 107. Thereafter, a sixth step may include storing details corresponding to each of the set of clusters generated in the storage module 106 via the interface INT 4. In addition, a seventh step may include sending an acknowledgement trigger corresponding to each of the set of clusters generated to the TSE module 111 via connector C3.

The TSE module 111 may execute a set of test scripts for data validation in each of the set of clusters generated. The TSE module 111 may include a set of key functionalities for executing the set of test scripts. A first functionality of the TSE module 111 may include retrieving connection details of the source and the target of the external data sources (data bases)102 or the external file systems (file storage) 103 along with the set of test scripts from the test management system 104 via interface INT 3. A second functionality may include establishing mapping between the source and the target of the external data sources (data bases)102 or the external file systems (file storage) 103 and determining the set of test scripts. A third functionality may include sending the mapping details of the source and the target of the external data sources (data bases)102 or the external file systems (file storage) 103 along with the set of test scripts to the reporting module 112 via connector C4. A fourth functionality may include triggering a test execution engine based of the TSE module 111 based on acknowledgement received from the CWS module 110 via connector C3. A fifth functionality may include execution of the set of test scripts, and reporting results of execution to the reporting module 112 via connector C4. A sixth functionality may include posting completion of the set of test scripts execution.

The reporting module 112 may collate results of execution of each of the set of test scripts published by the TSE module 111. It should be noted that, the results of execution of each of the test scripts may be generated based on execution of plurality of metadata received from the external data sources (data bases)102 or the external file systems (file storage) 103. Moreover, the results corresponding to each of the set of test scripts may be represented to the user in a presentable format on the UI 105 integrated via interface INT 5. In addition, the reporting module 112 may upload the results into the test management system 104 via interface INT 3.

It should be noted that all such aforementioned modules 101-111 may be implemented in programmable hardware devices such as programmable gate arrays, programmable array logic, programmable logic devices, or the like. Alternatively, all such aforementioned modules 101-111 may be implemented in software for execution by various types of processors. An identified module of executable code may, for instance, include one or more physical or logical blocks of computer instructions which may, for instance, be organized as an object, procedure, function, or other construct. Nevertheless, the executables of an identified module need not be physically located together but may include disparate instructions stored in different locations which, when joined logically together, comprise the module and achieve the stated purpose of the module. Indeed, a module of executable code may be a single instruction, or many instructions, and may even be distributed over several different code segments, among different applications, and across several memory devices.

Figure 2:
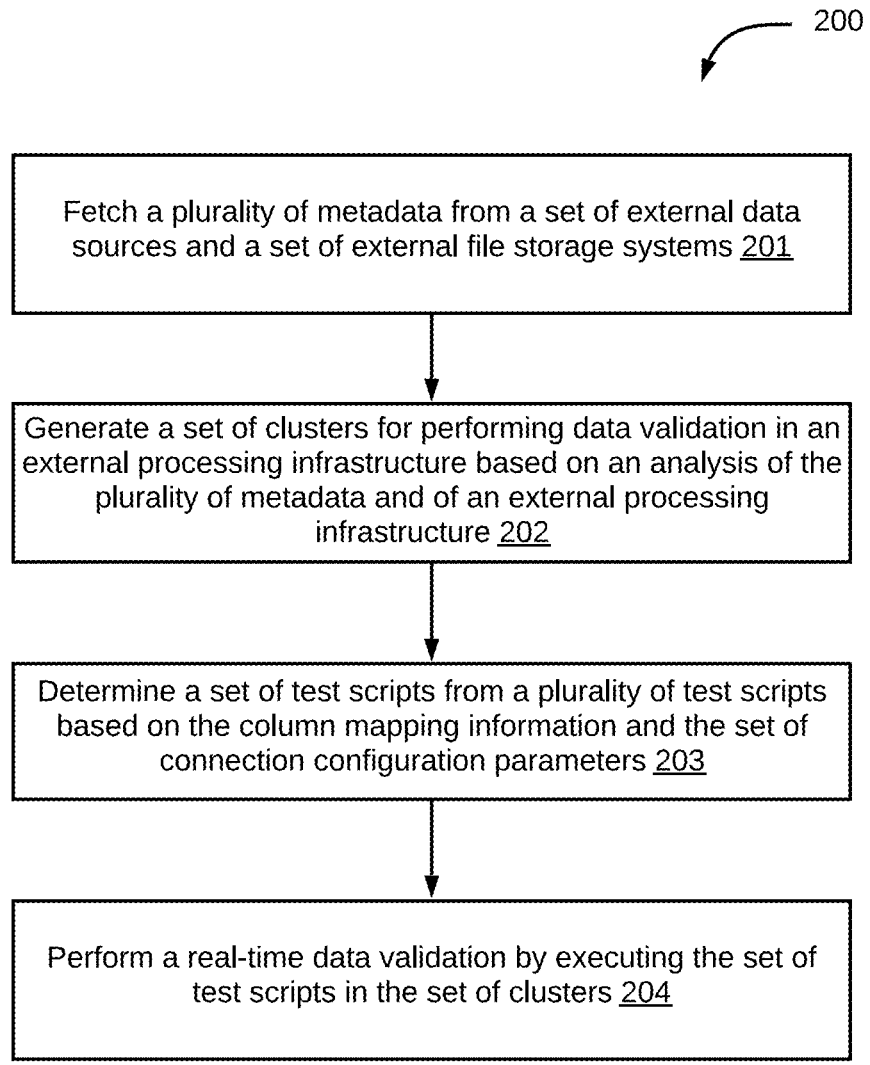
FIG. 2 is a flow diagram of an exemplary process for performing real-time data validation, in accordance with some embodiments of the present disclosure.

Referring now to FIG. 2, an exemplary process 200 for performing real-time data validation is depicted via a flowchart, in accordance with some embodiments of the present disclosure. At step 201, the plurality of metadata may be fetched from the set of external data sources and the set of external file storage systems. The set of external data sources may correspond to the external data sources 102. In addition, the set of external file storage systems may correspond to the external file systems 103. The plurality of metadata may be fetched along with a set of connection configuration parameters and column mapping information. In an embodiment, the set of connection configuration may include the source and the target details corresponding to each of the plurality of metadata. Moreover, the set of external data sources may comprise one or more source data sources and one or more target data sources. In addition, the set of external file storage systems may comprise one or more source external file storage systems and one or more target external file storage systems.

However, in order to fetch the plurality of metadata, the set of connection configuration parameters may be verified by forming a connection string based on a type of connection. The set of connection configuration parameters may include, but is not limited to, at least one of a Uniform Resource Locator (URL) of a database, credentials of the database, a name of the database, a port number for the database, and a type of the database, a path to a file, and a delimiter for the file. Additionally, the column mapping information may be verified based on a count of columns on a source connection and a count of columns on a target connection.

At step 202, the set of clusters may be generated for performing data validation in an external processing infrastructure based on an analysis of the plurality of metadata and of an external processing infrastructure. In an embodiment, the external processing infrastructure may correspond to the external infrastructure ecosystem 107. Further, in order to generate the set of clusters, a number of clusters and a size of each of the set of clusters that are required may be determined, for performing data validation using an AI model. Moreover, the AI model may be trained for the external processing infrastructure to determine the number of clusters and the size of each of the set of clusters based on a size of data on the set of external data sources and the set of external file storage systems. In addition, the AI model is trained for the external processing infrastructure based on a plurality of parameters related to the external processing infrastructure. The plurality of parameters may include a size of available storage, a size of temporary memory, a speed of Central Processing Unit (CPU), and a number of cores in the CPU.

At step 203, a set of test scripts may be determined from a plurality of test scripts. The set of test scrips may be determined based on the column mapping information and the set of connection configuration parameters. In addition, the set of test scripts determined may be configured to validate data from each of the plurality of external data sources and each of the plurality of external file storage systems. Further, at step 204, a real-time data validation may be performed by executing the set of test scripts in the set of clusters. Based on the real-time validation of the data, one or more reports may be generated. Moreover, each of the one or more reports generated may include data validation details and data mismatch details. In addition, each of the one or more reports generated may comprise the plurality of parameters. The plurality of parameters may include, but is not limited to a test script name, a connection type, an external source data source, an external target system, an execution start time, an execution end time, and an execution status.

Figure 3:
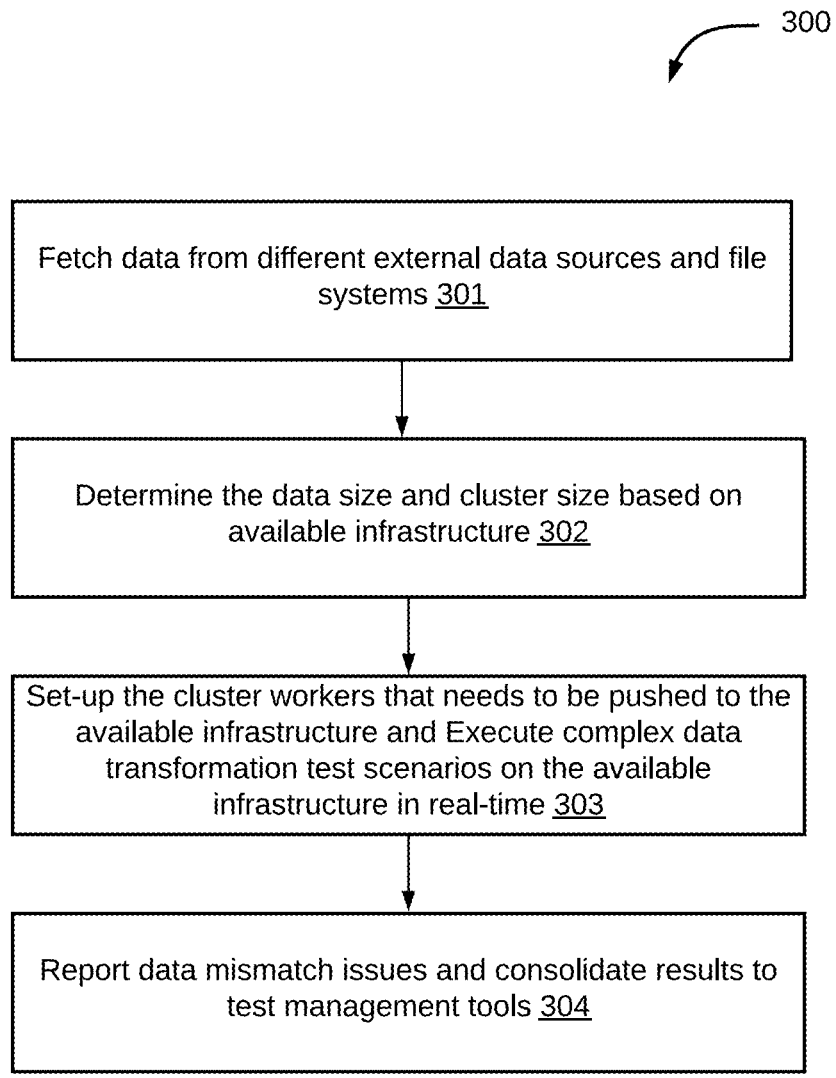
FIG. 3 is a flow diagram of a detailed exemplary process for performing real-time data validation, in accordance with some embodiments of the present disclosure.

Referring now to FIG. 3, an exemplary process 300 for performing real-time data validation is depicted in greater detail via a flowchart, in accordance with some embodiments of the present disclosure. At step 301, the plurality of metadata may be fetched from the set of external data sources and the set of external file storage systems. In an embodiment, the set of external data sources may correspond to the external data sources (databases) 102. In another embodiment, the set of external file storage system may correspond to the external file systems (file storage) 103. In this step, the set of connection parameters may be fetched and analyzed in order to verify whether the connection to the source is successful. The set of connection configuration parameters may include but is not limited to, the at least one of a Uniform Resource Locator (URL) of the database, credentials of the database, the name of the database, the port number for the database, and the type of the database, the path to a file, and the delimiter for the file. Moreover, post verification the details about the set of connection configuration parameters may be stored in the storage module 106. In addition, the column mapping information (also referred as column mapping details) may be identified in order to performs verification corresponding to the connection to the source.

At step 302, the data size corresponding to data from each of the plurality of external data sources and each of the plurality of external file storage system may be analyzed in order to determine the set of clusters. In addition, the set of clusters may be determined based on the external processing infrastructure for processing request of the data validation and verification. The set of clusters comprises determining the number of clusters and the size of each of the set of clusters that may be required for performing data validation. In reference to FIG. 1, the external processing infrastructure may correspond to the external infrastructure eco-system 107. In addition, the CWD module 109 may take as input the plurality of metadata from the data retrieval module 108. Thereafter, the CWD module 109 may pass the input received from the data retrieval module 108 along with the set of clusters generated to the CWS module 110. The CWS module 110 may the generate the set of test scripts corresponding to the set of clusters based on request of the TSE module 111. In an embodiment, the set of test scripts may also be referred as workers or cluster workers.

At step 303, the cluster workers (i.e., the set of test scripts) that may be setup may be pushed in an available infrastructure. The available infrastructure may correspond to the external processing infrastructure. Thereafter, the cluster workers may be executed in real time on the available infrastructure. In this step 303, the available infrastructure of the external processing infrastructure (i.e., the external infrastructure eco system 106) may be configured in order to execute the cluster workers. The cluster workers may be executed for processing each of the plurality of data. Further, based on execution of the cluster workers, the data mismatch details may be identified by performing the data validation. Thereafter, based on the data mismatch details identified, the consolidated report may be generated. In reference to FIG. 1 the consolidated report may be generated by the reporting module 112. It should be noted that, the CWS Module 110 of the system 100 may be responsible for determining the cluster workers. The CWS module 110 may acts as controller that may be responsible to manage all task allocations and actual data distribution. Moreover, the CWS module 110 may receive back, the data mismatch details identified based on the data validation performed.

At step 304, the consolidated report may be generated based on execution of each of the test scripts for data validation including the data mismatch details corresponding to each of the plurality of metadata for failed test scripts. In reference to FIG. 1, the reporting module 112 may generate the consolidated report based on inputs received from the TSE module 111. Thereafter, the reporting module 112 may upload the consolidated report generated to the test management system 104.

Figure 4:
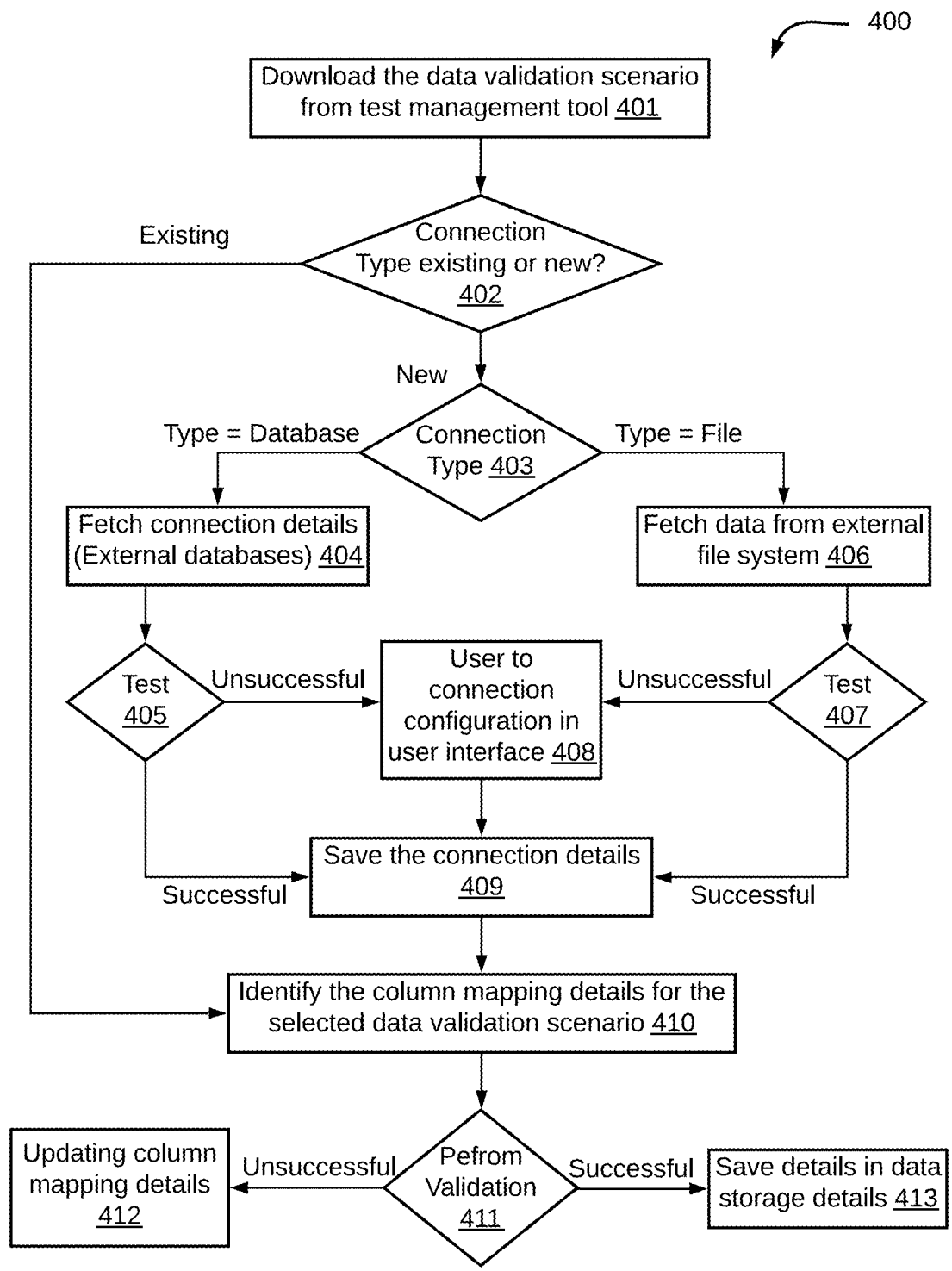
FIG. 4 is a flow chart of an exemplary process for verifying connection configuration details corresponding to external data sources and file systems, in accordance with some embodiments of the present disclosure.

Referring now to FIG. 4, an exemplary process 400 for verifying connection configuration details corresponding to external data sources and file systems is depicted via a flowchart, in accordance with some embodiments of the present disclosure. At step 401, the data validation scenario may be fetched from the test management system 104. In an embodiment, the data validation scenario may include the set of connection configuration parameters and the column mapping information corresponding to each of the plurality of data sources or file storage systems. By way of an example, the set of connection configuration parameters may comprise configuration details of a source connection and a target connection corresponding to each of the plurality of metadata. The set of connection configuration parameters may include, but is not limited to, the at least one of a Uniform Resource Locator (URL) of the database, credentials of the database, the name of the database, the port number for the database, and the type of the database, the path to a file, and the delimiter for the file. Moreover, the user may be also capable to configure the source connection and the target connection via INT 1 and INT 2. Thereafter, the user may provide the column mapping information to the data retrieval module 108. It should be noted that, the source connection or the target connection may either be the external data sources 102 or the external file systems 103. In addition, the source connection and the target connection may be tested by the type of connection chosen by the user. Further, the details corresponding to each of the source connection and the target connection may be saved in the data retrieval module 108.

At step 402, a decision may be taken to determine whether, the type of connection may be an existing connection or a new connection. In addition, when the type of connection is determined to be existing, then flow moves to step 410. Moreover, when the source connection and the target connection is the new connection, then at step 403, the new connection may be tested and saved in a metadata repository.

Once the type of connection may be determined to be the new connection, then at step 404, determine whether the set of connection configuration parameters may be of a database type. Based on determining the new connection as the database type, fetch the set of connection configuration parameters from the external data sources 102. The set of connection configuration parameters may include, but is not limited to, the at least one of a Uniform Resource Locator (URL) of the database, credentials of the database, the name of the database, the port number for the database, and the type of the database, the path to a file, and the delimiter for the file. Once the set of connection configuration parameters may be fetched and an appropriate connection string may be formed based on the database type chosen by the user. Thereafter, at step 405, and the set of connection configuration parameters corresponding to the database type may be tested. Moreover, when the set of connection configuration parameters may be successful, then at step 409, the plurality of metadata along with each of the set of connection configuration parameters may be fetched and saved. Additionally, when the set of connection configuration parameters may be unsuccessful, then at step 408, the user may be prompted to check the set of connection configuration parameters.

Similarly, at step 408, determine whether the set of connection configuration parameters may be of a flat file type. Based on determining the new connection as the flat file type, fetch the set of connection configuration parameters from the external file system 103. Further, the user may provide the path to a file and the delimiter (i.e., .txt/.csv format) in order to establish connection to the external file system 103. Once the set of connection configuration parameters may be fetched and an appropriate connection string may be generated based on the flat file type chosen by the user. Thereafter, at step 407, and the set of connection configuration parameters corresponding to the flat file type may be tested. Moreover, when the set of connection configuration parameters may be successful, then at step 409, the plurality of metadata along with each of the set of connection configuration parameters may be retrieved and saved. Additionally, when the set of connection configuration parameters may be unsuccessful, then at step 408, the user may be prompted to check the set of connection configuration parameters. In addition, the appropriate connection along with the set of connection configuration parameters may be stored in the storage module 106.

Once the set of connection configuration parameters to the source and the target connection may be successfully established, then at step 410, details comprising the set of connection configuration parameters along with the plurality of metadata may be saved in the storage module 106. Moreover, when the set of connection configuration parameters is unsuccessful, the user may be prompted to check the connection configuration parameters.

Once the set of connection configuration parameters may be successful, then at step 410, the plurality of data retrieved may be retrieved. Thereafter, at step 411, the validation may be performed corresponding to each of the data fields with the column mapping information (also referred as column mapping details) including both the source connection and the target connections. Moreover, for the validation, existence of each of the plurality of data fields may be compared. In case, if the validation is unsuccessful, then at step 412, the user may be prompted to update the column mapping information in user interface 105. Moreover, if the validation is successful, then at step 413, the set of configuration connection parameters corresponding to each of the plurality of data sources may be stored in the storage module 106.

Figure 5:
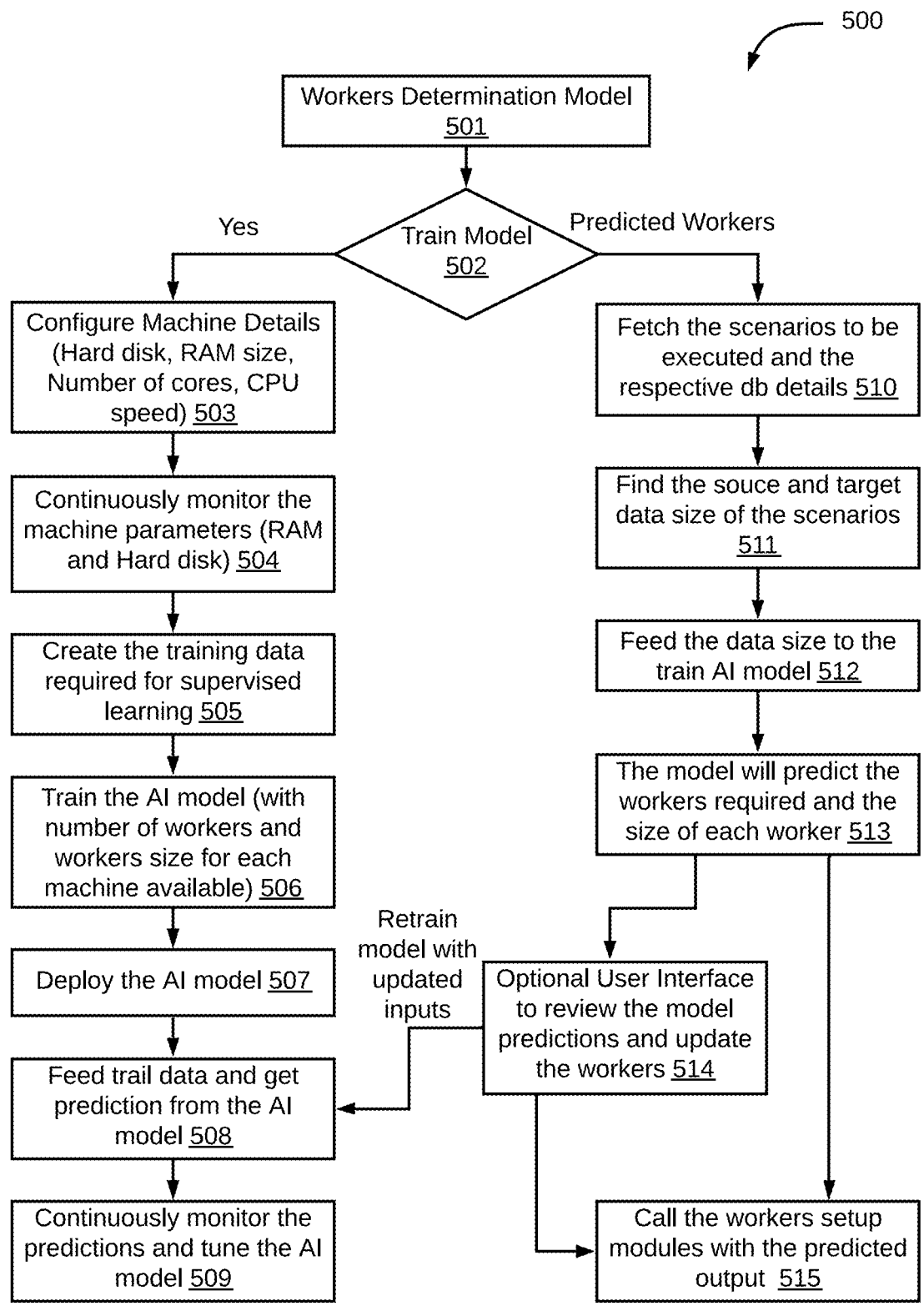
FIG. 5 is a flow chart of an exemplary process of training an AI model for predicting a set of clusters, in accordance with some embodiments of the present disclosure.

Referring now to FIG. 5, an exemplary process 500 of training an AI model for predicting a set of clusters is depicted via a flowchart, in accordance with some embodiments of the present disclosure. At step 501, the CWD module 109 may be depicted. The CWD module 109 may include the trained AI model depicted at step 502, that may be trained to predict the set of clusters corresponding to each of the plurality of metadata fetched. In order to train the AI model, at step 503, the user may configure and identify machine details (also referred as system 100 details). The machine details may be identified based on continuous monitoring of the plurality of parameters corresponding to the machine. The plurality of parameters may include, but is not limited to, a machine name, an Internet Protocol (IP) address, the size of available storage (i.e., the size of hard disk), the size of temporary memory (i.e., Random Access Memory size), the speed of the CPU, and the number of cores. At step 504, the plurality of parameters corresponding to the machine may be continuously monitored. Based on continuous monitoring of the plurality of parameters, the user may validate the plurality of parameters identified corresponding to the machine. Moreover, the user may update the plurality of parameters based on requirement.

In addition, based on the plurality of parameters corresponding to the machine (i.e., the system 100), the number of clusters and the size corresponding to each of the cluster may be identified. The number of clusters and the size corresponding to each of the cluster identified may be setup in the machine. Thereafter, at step 505, a training data may be identified based on the plurality of parameters corresponding to the machine. The training data may be used to train the AI model. In an embodiment, the AI model may be trained by performing a supervised learning. At step 506, the AI model may be trained based on the number of clusters and the size of each of the set of clusters. Further, at step 507, the trained AI model may be deployed for prediction of the number of clusters and the size of each of the set of clusters for a new plurality of metadata. At step 508, the training data may be fed to the AI model for generating the predictions corresponding to the training data. Thereafter, at step 509, the AI model may be fine-tuned based on continuous monitoring of the predictions corresponding to the training data.

Once the AI model of the CWD model 109 is trained, then the CWD model 109 may be used to predict a set of clusters corresponding to the new plurality of metadata. The prediction of the set of cluster comprises, determining the number of clusters and the size corresponding to each of the set of clusters for the new plurality of metadata. At step 510, the plurality of metadata along with the respective set of connection configuration parameters may be fetched. Further, at step 511, a size of data (comprising a source and a target data size) may be identified corresponding to each of the plurality of metadata. At step 512, the size of the data identified may be fed to the trained AI model.

Thereafter, at step 513, the trained AI model may predict the number of clusters and the size corresponding to each of the cluster for the plurality of metadata. Moreover, the number of clusters and the size corresponding to each of the cluster may be predicted based on the previous training data. At step 514, the user may review and update the number of clusters and the size corresponding to each of the cluster via the UI 105. It should be noted that, the review and update the number of clusters and the size corresponding to each of the cluster, may an optional step during initial stages to fine tune the AI model for better prediction. Additionally, at step 515, the number of clusters and the size corresponding to each of the cluster may be send to the CWS module 110.

Figure 6:
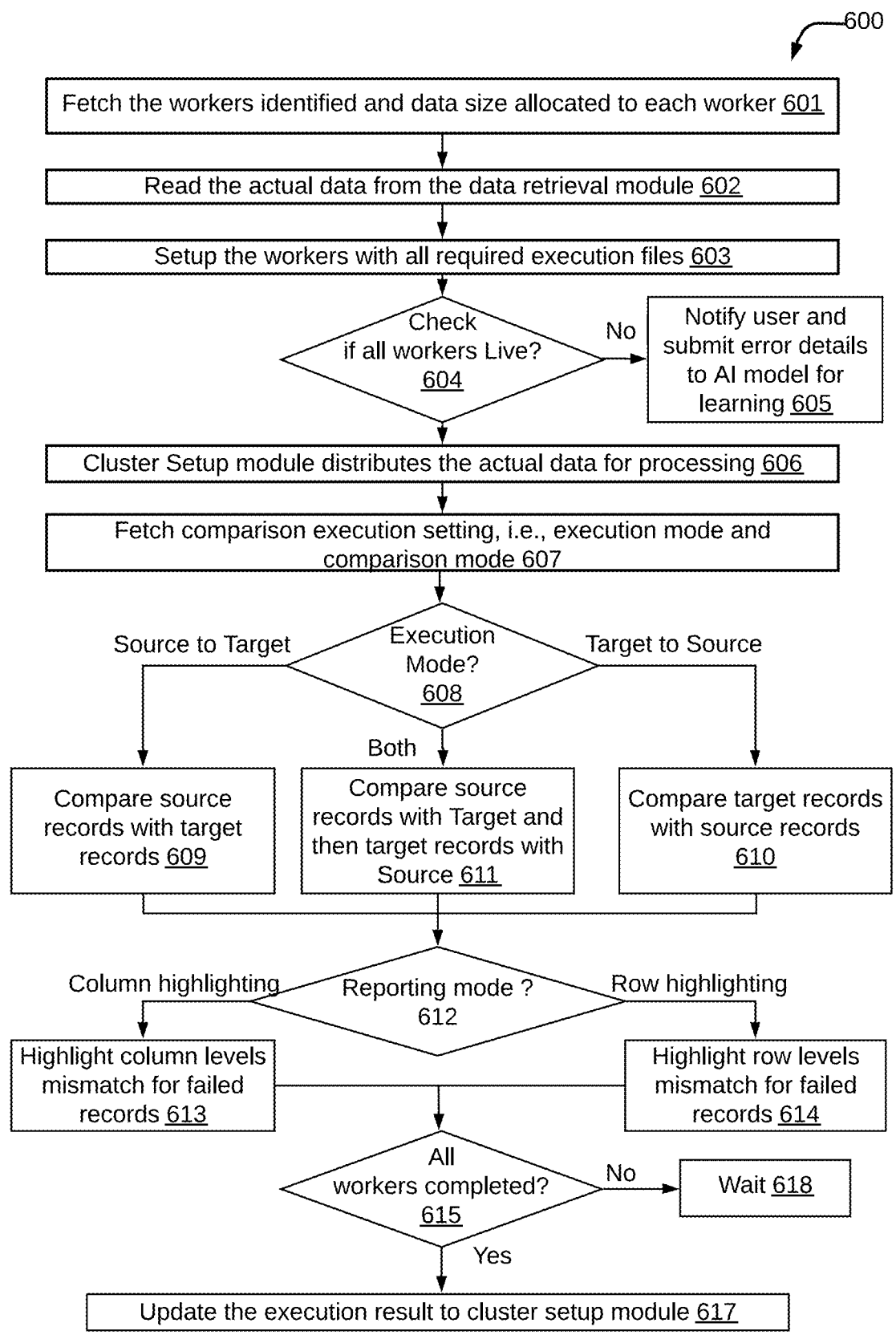
FIG. 6 is a flow chart of an exemplary process of determining a set of test scripts based on the set of clusters generated corresponding to a plurality of metadata, in accordance with some embodiments of the present disclosure.

Referring now to FIG. 6, an exemplary process 600 of determining a set of test scripts based on the set of clusters generated corresponding to a plurality of metadata is depicted via a flowchart, in accordance with some embodiments of the present disclosure. At step 601, the number of clusters and the size corresponding to each of the cluster may be fetched as an input from the CWD module 109. The input fetched may then be analyzed to reserve the available infrastructure in the external processing infrastructure. It should be noted, a set of machines may be allocated as workers in order to process the input fetched. At step 602, an actual data may be read from the data retrieval module 108 for actual comparison. In an embodiment, the actual data comprises the plurality of metadata and the respective set of connection configuration parameters.

At step 603, the set of test scripts (also referred as the cluster workers) may be setup with executable files. It should be noted, a set of machines may be allocated as workers in order to process the input fetched. The cluster workers may contain implemented modules of actual logic to compare the plurality of metadata and report back results generated. Moreover, the cluster workers may only be configured if they are not already present. The executable files may be capable for parallel processing. As will be appreciated, the parallel processing may happen in memory in order to provide data privacy and security. Moreover, the cluster workers may not maintain any physical copies of the data in local system. In other words, as soon as processing completes for any of the cluster workers, all customer specific data may get erased. At step 604, the CWS module 110 may perform a check to may make sure that all the identified cluster workers required for processing may be live. In addition, if the cluster workers are not live then, at step 605, the user may be notified to submit error details to the AI model for learning. Further, if the cluster workers may not be live then the CWS module 110 may wait and keeps trying to check status of the cluster workers.

At step 606, the CWS module 110, may distribute the actual data for further processing. In this step, once the cluster workers may be configured with the executable files and may be live, the CWS module 110 may assigns tasks to each of the cluster workers. Thereafter, the tasks assigned to each of the cluster workers may be distributed based on the AI model recommendation to perform the data validation. Moreover, the CWS module 110 may monitor status of the assigned tasks and releases or re-assign the cluster worker.

At step 608, an execution mode corresponding to each of the cluster workers may be checked. It should be noted that, the system 100 may use default execution setting for the execution mode 608 and the reporting mode 612. Moreover, the default execution setting may be provided by the user. The user may be provided the UI 105 to override the default execution setting. In an embodiment, when the execution mode is source to target, at step 609, a source records (also referred as the source data) may be compared with a target records (also referred as the target data) corresponding to each of the plurality of metadata. In an embodiment, the source records and the target records may be generated based on the set of connection configuration parameters. In addition, the data mismatch details in the source records may be considered as failed record. The data mismatch details in source records may be highlighted as per the reporting mode 612 at a column level 613 or a row level 614. Moreover, a record that may not be part of the target records may be considered as a unique record. The unique record may be highlighted as the row level mismatch 614.

In another embodiment, when the execution mode is target to source, at step 610, the target records may be compared with the source records corresponding to each of the plurality of metadata. In addition, the data mismatch details in the target records may be considered as failed record. The data mismatch details in source records may be highlighted as per the reporting mode 612 at the column level 613 or the row level 614. Moreover, a record that may not be part of the source records may be considered as a unique record. The unique record may be highlighted as the row level mismatch 614.

In yet another embodiment, when the execution mode is both, i.e., the source to target and the target to source, then at step 611, each of the source records may be compared to the target records and may be highlighted accordingly. Thereafter, each of the target records may be compared with the source records and highlighted accordingly. However, since the CWS module 110 may keep on monitoring the cluster workers, therefore at step 615, the CWS module 110 may perform a check. The check may be performed in order to identify whether each of the cluster workers have finished its execution or not. Further, if each of the cluster workers have finished its execution, then at step 617, results of the execution may be reported back to the CWS module 110. In addition, the results of the execution generated may be reported back to the CWS module in order to prepare the consolidated report along with the mismatch details. The consolidated report may then be handled by the reporting module 112. Moreover, if each of the cluster worker may not have finished its execution, then at step 618, the CWS module 110 may wait for each of the cluster workers to complete its execution.

Figure 7:
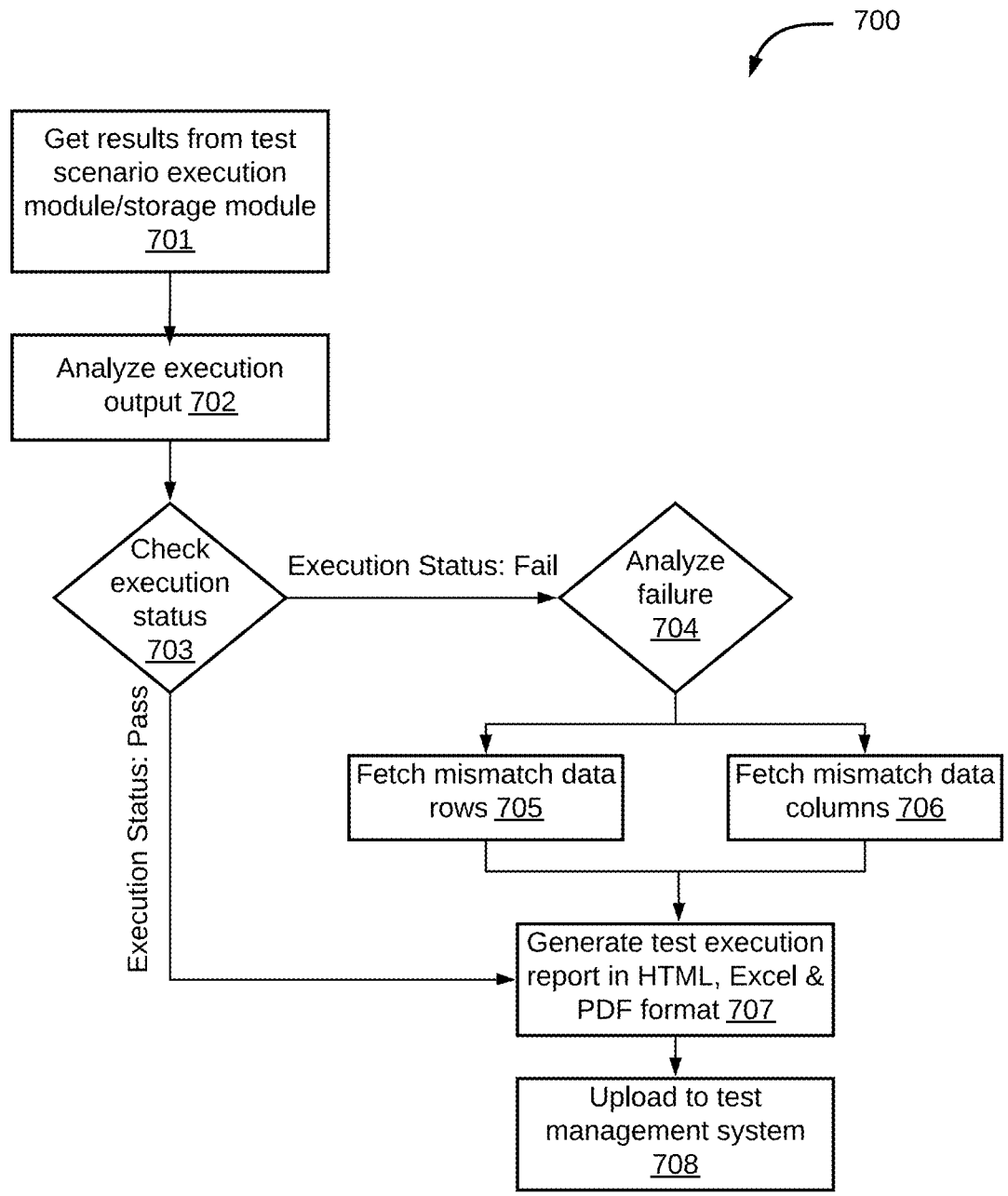
FIG. 7 is a flow chart of an exemplary process of generating a consolidated report along with mismatch details reported corresponding to the plurality of metadata, in accordance with some embodiments of the present disclosure.

Referring now to FIG. 7, an exemplary process 700 of generating a consolidated report along with mismatch details reported corresponding to the plurality of metadata is depicted via a flowchart, in accordance with some embodiments of the present disclosure. At step 701, the execution results may be fetched from the TSE module 111. At step 702, the execution results generated by the CWS module 110 corresponding to each of the data validation test scenario may be analyzed based on the plurality of parameters. In an embodiment, the data validation test scenario may include the plurality of metadata along with the respective set of connection configuration parameters. The plurality of parameters may include, but is not limited to, the test scenario name, the connection type, the external source system, the external target system, the execution starts time, the execution end time, and the execution status. At step 703, the execution status corresponding to the data validation test scenarios may be checked. Based on the check performed, when the execution status may be determined as pass (successful), then at step 707, a process to generate the consolidated report may be initiated. The consolidated report may also be referred as the test execution report. Moreover, when the execution status may be determined as fail (unsuccessful), then at step 704, a type of failure may be analyzed in the data validation test scenario.

In an embodiment, if the execution status is determined as fail due a row level mismatch, then at step 705, each of a mismatch data row may be fetched. In another embodiment, if the execution status is determined as fail due a column level mismatch, then at step 706, each of a mismatch data column may be fetched. Once the type of failure may be analyzed a failure data record may be fetched and the consolidated report generation process may be initiated. The failure data record may include the mismatch data rows and the mismatch data columns. In an embodiment, the failure data record may correspond to the data mismatch details. Thereafter, at step 707, the consolidated report may be generated, based on the plurality of metadata and the mismatch details. The consolidated report may be generated in the structured format. The structured format may include, but is not limited to, a Hyper Text Markup Language (HTML) format, an excel format, and a Portable Document Format (PDF). Thereafter, at step 708, the consolidated report may be uploaded and saved in the test management system 104.

Figure 8:
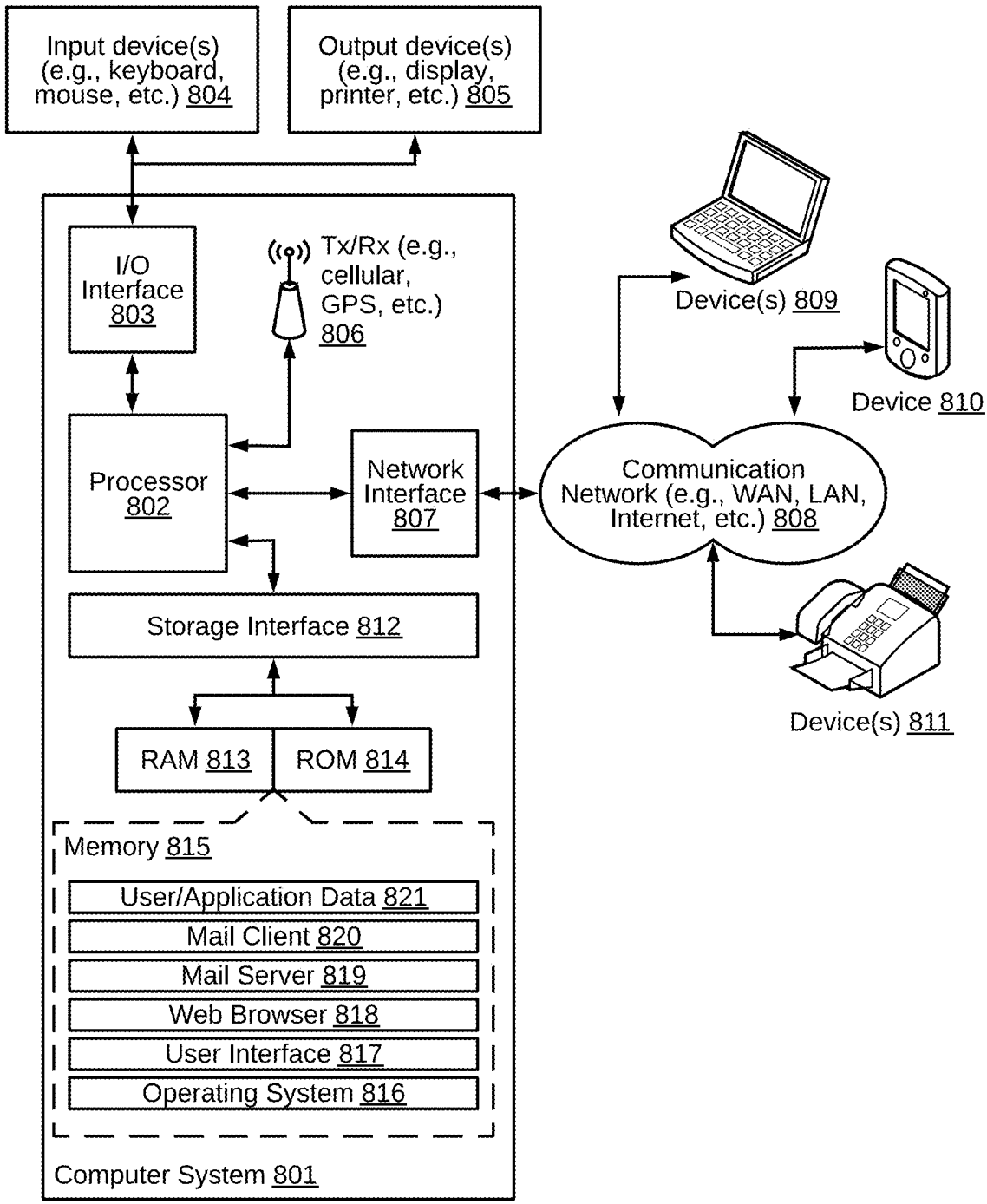
FIG. 8 illustrates a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 8, a block diagram of an exemplary computer system 801 for implementing various embodiments is illustrated. Computer system 801 may include a central processing unit ("CPU" or "processor") 802. Processor 802 may include at least one data processor for executing program components for executing user generated or system-generated requests. A user may include a person, a person using a device such as those included in this disclosure, or such a device itself. The Processor 802 may include specialized processing units such as integrated system (bus) controllers, memory management control units, floating point units, graphics processing units, digital signal processing units, etc. The Processor 802 may include a microprocessor, such as AMD® ATHLOM® microprocessor, DURON® microprocessor or OPTERON® microprocessor, ARM's application, embedded or secure processors, IBM® POWERPC®, INTEL'S CORE® processor, ITANIUM® processor, XEON® processor, CELERON® processor or other line of processors, etc. The Processor 802 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

The Processor 802 may be disposed in communication with one or more input/output (I/O) devices via an I/O interface 803. The I/O interface 803 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using the I/O interface 803, computer system 801 may communicate with one or more I/O devices. For example, an input device 804 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 805 may be a printer, fax machine, video display (for example, cathode ray tube (CRT), liquid crystal display (LCD), light-emitting diode (LED), plasma, or the like), audio speaker, etc. In some embodiments, a transceiver 806 may be disposed in connection with processor 802. Transceiver 806 may facilitate various types of wireless transmission or reception. For example, transceiver 806 may include an antenna operatively connected to a transceiver chip (for example, TEXAS® INSTRUMENTS WILINK WL12836 transceiver, BROADCOM® BCM4750IUB8® transceiver, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 802 may be disposed in communication with a communication network 808 via a network interface 807. The network interface 807 may communicate with communication network 808. The network interface 807 may employ connection protocols including, without limitation, direct connect, Ethernet (for example, twisted pair 10/100/1000 Base T), transmission control protocol/internet protocol (TCP/IP), token ring, IEEE 802.11a/b/g/n/x, etc. The communication network 808 may include, without limitation, a direct interconnection, local area network (LAN), wide area network (WAN), wireless network (for example, using Wireless Application Protocol), the Internet, etc. Using the network interface 807 and the communication network 808, computer system 801 may communicate with devices 809, 810, and 811. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® e-reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, the computer system 801 may itself embody one or more of these devices.

In some embodiments, the processor 802 may be disposed in communication with one or more memory devices 815 (for example, RAM 813, ROM 814, etc.) via a storage interface 812. The storage interface 812 may connect to memory 815 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices 815 may store a collection of program or database components, including, without limitation, an operating system 816, user interface application 817, web browser 818, mail server 819, mail client 820, user/application data 821 (for example, any data variables or data records discussed in this disclosure), etc. The operating system 816 may facilitate resource management and operation of the computer system 801. Examples of the operating systems 816 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 817 may facilitate display, execution, interaction, manipulation, or operation of program components through textual or graphical facilities. For example, user interfaces 817 may provide computer interaction interface elements on a display system operatively connected to the computer system 801, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, the computer system 801 may implement a web browser 818 stored program component. The web browser 818 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, the computer system 801 may implement a mail server 819 stored program component. The mail server 819 may be an Internet mail server such as MICROSOFT® EXCHANGE® mail server, or the like. Mail server 819 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. The mail server 819 may utilize communication protocols such as internet message access protocol (IMAP), messaging application programming interface (MAPI), Microsoft Exchange, post office protocol (POP), simple mail transfer protocol (SMTP), or the like. In some embodiments, the computer system 801 may implement a mail client 820 stored program component. The mail client 820 may be a mail viewing application, such as APPLE MAIL® mail-client, MICROSOFT ENTOURAGE® mail client, MICROSOFT OUTLOOK® mail client, MOZILLA THUNDERBIRD® mail client, etc.

In some embodiments, the computer system 801 may store user/application data 821, such as the data, variables, records, etc. as described in this disclosure. Such databases may be implemented as fault-tolerant, relational, scalable, secure databases such as ORACLE® database or SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

As will be appreciated by those skilled in the art, the techniques described in the various embodiments discussed above are not routine, or conventional, or well understood in the art. The techniques discussed above provide real-time data validation. In particular, the technique provided may fetch a plurality of metadata from a set of external data sources and a set of external file storage systems. The technique also provides generation of a set of clusters for performing data validation in an external processing infrastructure based on an analysis of the plurality of metadata and of an external processing infrastructure. Further, the technique provided also provides determination of a set of test scripts from a plurality of test scripts based on the column mapping information and the set of connection configuration parameters. Thereafter, the technique also provides a real-time data validation by executing the set of test scripts in the set of clusters.

Thus, the techniques provide for a number of benefits including, but not limited to, automated identification by setting up required environment for data comparison and validation using existing infrastructure. Moreover, the technique may define test cases and test suites for execution. Thus, the technique may execute complex data transformations and validations, and may identify failures (i.e., data mismatch). Thus, the technique provided may also help in reporting data mismatches to the user in various color codes and upload results in the test management system.

The specification has described method and system for performing real-time data validation. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for performing real-time data validation, the method comprising:
   fetching, by a data validation device, a plurality of metadata from a set of external data sources and a set of external file storage systems, wherein the plurality of metadata is fetched along with a set of connection configuration parameters and column mapping information;
   verifying, by the data validation device, the set of connection configuration parameters using a data validation scenario, wherein the set of connection configuration parameters comprises configuration details of a source connection and a target connection corresponding to each of the plurality of metadata, wherein the data validation scenario comprises performing data validation corresponding to each of a plurality of data fields with the column mapping information including both the source connection and the target connection and comparing existence of each of the plurality of data fields, and wherein the set of connection configuration parameters is verified by forming a connection string based on a type of connection;
   determining, by the data validation device, whether the verification of the set of connection configuration parameters is successful;
   storing, by the data validation device, the set of connection configuration parameters in a memory when the verification of the set of connection configuration parameters is success, rendering a message to a user to check the set of configuration parameters when the verification of the set of connection configuration parameters is unsuccessful;
   determining, by the data validation device, a number of clusters and a size of each cluster that are required for performing data validation based on an analysis of the plurality of metadata using an Artificial Intelligence (AI) model, wherein the AI model is trained for the external processing infrastructure to determine the number of clusters and the size of each of the set of clusters based on a size of data on the set of external data sources and the set of external file storage systems;
   generating, by the data validation device, a set of clusters for performing data validation in the external processing infrastructure based on the number of clusters and the size of each cluster;
   determining, by the data validation device, a set of test scripts from a plurality of test scripts based on the column mapping information and the set of connection configuration parameters, wherein the set of test scripts is configured to validate data from each of a plurality of external data sources and each of a plurality of external file storage systems; and
   performing, by the data validation device, a real-time data validation by executing the set of test scripts in the set of clusters.

2. The method of claim 1, wherein the set of external data sources comprises one or more source data sources and one or more target data sources, wherein the set of external file storage systems comprises one or more source external file storage systems and one or more target external file storage systems.

3. The method of claim 1, wherein the set of connection configuration parameters comprises at least one of a Uniform Resource Locator (URL) of a database, credentials of the database, a name of the database, a port number for the database, and a type of the database, a path to a file, and a delimiter for the file; and
   the column mapping information is verified based on a count of columns on a source connection and a count of columns on a target connection.

4. The method of claim 1, wherein the AI model is trained for the external processing infrastructure based on a plurality of parameters related to the external processing infrastructure, wherein the plurality of parameters comprises a size of available storage, a size of temporary memory, a speed of Central Processing Unit (CPU), and a number of cores in the CPU.

5. The method of claim 1, wherein the AI model is re-trained based on inputs from a user, wherein the inputs comprise feedback on the number of clusters and the size of each of the set of clusters.

6. The method of claim 1, wherein generating the set of clusters further comprises:
   configuring each of the set of clusters with required execution files; and
   distributing data from the set of external data sources and the set of external file storage systems among the set of clusters for performing data validation, wherein the data validation comprises:
   comparing source data with target data in an execution mode; and
   indicating at least one of a column level mismatch and a row level mismatch.

7. The method of claim 6, further comprising generating one or more reports based on the real-time data validation of data, wherein each of the one or more reports comprises data validation details and data mismatch details.

8. The method of claim 7, wherein the report comprises the plurality of parameters, and wherein the plurality of parameters comprises a test script name, a connection type, an external source data source, an external target system, an execution start time, an execution end time, and an execution status.

9. A system for performing real-time data validation, the system comprising:
a data validation device comprising a processor and a memory communicatively coupled to the processor, wherein the memory stores processor-executable instructions, which, on execution, causes the processor to:
fetch a plurality of metadata from a set of external data sources and a set of external file storage systems, wherein the plurality of metadata is fetched along with a set of connection configuration parameters and column mapping information;
verify the set of connection configuration parameters using a data validation scenario, wherein the set of connection configuration parameters comprises configuration details of a source connection and a target connection corresponding to each of the plurality of metadata, wherein the data validation scenario comprises performing data validation corresponding to each of a plurality of data fields with the column mapping information including both the source connection and the target connection and comparing existence of each of the plurality of data fields, and wherein the set of connection configuration parameters is verified by forming a connection string based on a type of connection;
determine whether the verification of the set of connection configuration parameters is successful;
storing the set of connection configuration parameters in a memory when the verification of the set of connection configuration parameters is success, rendering a message to a user to check the set of configuration parameters when the verification of the set of connection configuration parameters is unsuccessful;
determine a number of clusters and a size of each cluster that are required for performing data validation based on an analysis of the plurality of metadata using an Artificial Intelligence (AI) model, wherein the AI model is trained for the external processing infrastructure to determine the number of clusters and the size of each of the set of clusters based on a size of data on the set of external data sources and the set of external file storage systems;
generate a set of clusters for performing data validation in the external processing infrastructure based on the number of clusters and the size of each cluster;
determine a set of test scripts from a plurality of test scripts based on the column mapping information and the set of connection configuration parameters, wherein the set of test scripts is configured to validate data from each of a plurality of external data sources and each of a plurality of external file storage systems; and
perform a real-time data validation by executing the set of test scripts in the set of clusters.

10. The system of claim 9, wherein the set of external data sources comprises one or more source data sources and one or more target data sources, wherein the set of external file storage systems comprises one or more source external file storage systems and one or more target external file storage systems.

11. The system of claim 9, wherein the set of connection configuration parameters comprises at least one of a Uniform Resource Locator (URL) of a database, credentials of the database, a name of the database, a port number for the database, and a type of the database, a path to a file, and a delimiter for the file; and
the column mapping information is verified based on a count of columns on a source connection and a count of columns on a target connection.

12. The system of claim 9, wherein the AI model is trained for the external processing infrastructure based on a plurality of parameters related to the external processing infrastructure, wherein the plurality of parameters comprises a size of available storage, a size of temporary memory, a speed of Central Processing Unit (CPU), and a number of cores in the CPU.

13. The system of claim 9, wherein the AI model is re-trained based on inputs from a user, wherein the inputs comprise feedback on the number of clusters and the size of each of the set of clusters.

14. The system of claim 9, wherein the processor generates the set of clusters by:
configuring each of the set of clusters with required execution files; and
distributing data from the set of external data sources and the set of external file storage systems among the set of clusters for performing data validation, wherein the data validation comprises:
comparing source data with target data in an execution mode; and
indicating at least one of a column level mismatch and a row level mismatch.

15. The system of claim 14, wherein the processor-executable instructions further cause the processor to generate one or more reports based on the real-time data validation of data, wherein each of the one or more reports comprises data validation details and data mismatch details.

16. The system of claim 15, wherein the report comprises the plurality of parameters, and wherein the plurality of parameters comprises a test script name, a connection type, an external source data source, an external target system, an execution start time, an execution end time, and an execution status.

17. A non-transitory computer-readable storage medium storing computer-executable instructions for:
fetching a plurality of metadata from a set of external data sources and a set of external file storage systems, wherein the plurality of metadata is fetched along with a set of connection configuration parameters and column mapping information;
verify the set of connection configuration parameters using a data validation scenario, wherein the set of connection configuration parameters comprises configuration details of a source connection and a target connection corresponding to each of the plurality of metadata, wherein the data validation scenario comprises performing data validation corresponding to each of a plurality of data fields with the column mapping information including both the source connection and the target connection and comparing existence of each of the plurality of data fields, and wherein the set of connection configuration parameters is verified by forming a connection string based on a type of connection;

determining whether the verification of the set of connection configuration parameters is successful;

storing the set of connection configuration parameters in a memory when the verification of the set of connection configuration parameters is success, rendering a message to a user to check the set of configuration parameters when the verification of the set of connection configuration parameters is unsuccessful;

determining a number of clusters and a size of each cluster that are required for performing data validation based on an analysis of the plurality of metadata using an Artificial Intelligence (AI) model, wherein the AI model is trained for the external processing infrastructure to determine the number of clusters and the size of each of the set of clusters based on a size of data on the set of external data sources and the set of external file storage systems;

generating a set of clusters for performing data validation in the external processing infrastructure based on the number of clusters and the size of each cluster;

determining a set of test scripts from a plurality of test scripts based on the column mapping information and the set of connection configuration parameters, wherein the set of test scripts is configured to validate data from each of a plurality of external data sources and each of a plurality of external file storage systems; and performing a real-time data validation by executing the set of test scripts in the set of clusters.

\* \* \* \* \*